Dec. 22, 1936.  D. S. KELLAM  2,064,919
HOSE CLAMP
Filed Oct. 24, 1935  2 Sheets-Sheet 1

Inventor
David S. Kellam
By C. A. Snow & Co.
Attorneys.

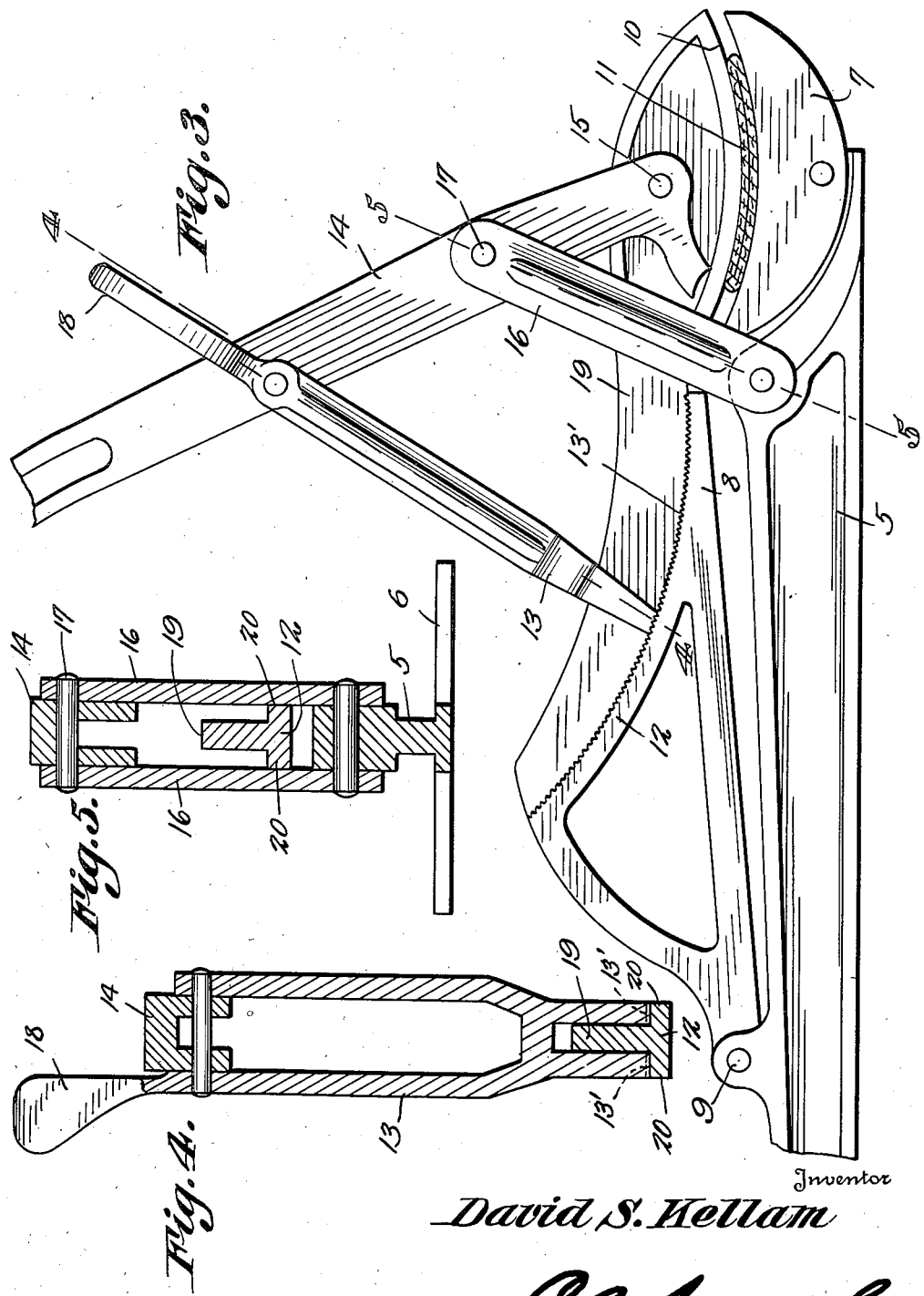

Patented Dec. 22, 1936

2,064,919

UNITED STATES PATENT OFFICE 2,064,919

HOSE CLAMP

David S. Kellam, Atlanta, Ga.

Application October 24, 1935, Serial No. 46,602

1 Claim. (Cl. 251—5)

This invention relates to hose clamps of the type adapted to compress hose to prevent the flow of water therethrough.

The primary object of the invention is to provide a clamp of this character embodying hose clamping members, means being provided for locking the clamping members in their active or clamping positions.

Another object of the invention is the provision of locking means which will operate to effectively cut off the flow of water through a hose, regardless of the thickness of the wall of the hose.

With the foregoing and other objects in view, which will appear as the description proceeds, the invention resides in the combination and arrangement of parts and in details of construction hereinafter described and claimed, it being understood that changes in the precise embodiment of the invention hereinafter disclosed, may be made within the scope of what is claimed, without departing from the spirit of the invention.

Referring to the drawings:

Figure 3 is an elevational view illustrating the hose clamp in its clamping position.

Figure 4 is a sectional view taken on line 4—4 of Figure 3.

Figure 5 is a sectional view taken on line 5—5 of Figure 3.

Figure 1:
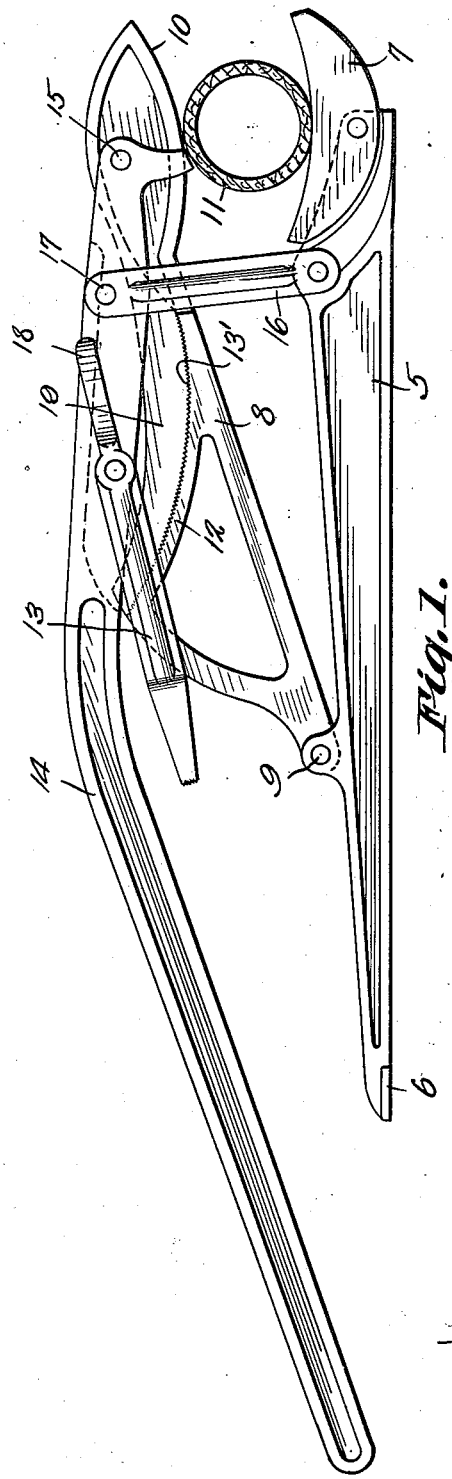
Figure 1 is a side elevational view of a hose clamp constructed in accordance with the invention.
Figure 2:
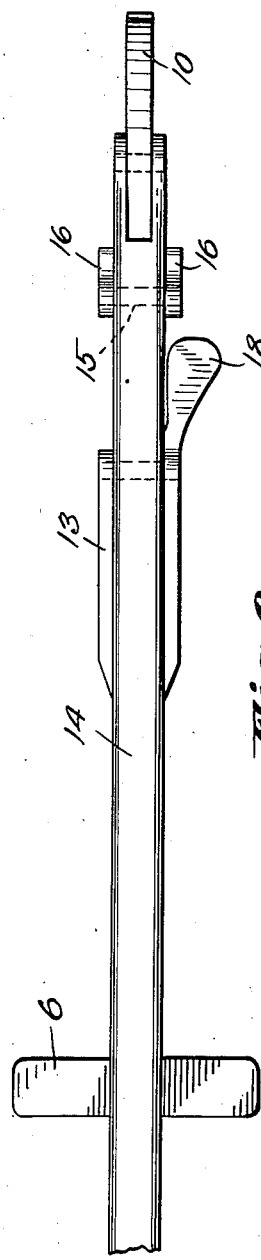
Figure 2 is a plan view thereof.

Referring to the drawings in detail, the clamp embodies a base member indicated generally by the reference character 5, the base member being provided with a transversely extending plate 6 near one end thereof, holding the base member against tilting, when the clamp is operated.

At the forward end of the base member 5 is a pivoted jaw 7, the upper surface thereof being curved, as clearly shown by Figure 1 of the drawings.

The reference character 8 designates the movable section of the hose clamp which is pivotally mounted on the base member 5 at 9. At the free end of the member 8 is a jaw 10 formed with a convex hose engaging surface so that when the movable member 8 moves to clamp a hose, which in the present showing is indicated by the reference character 11, the hose will be compressed in such a way that it will not be broken under the action of the clamp. The movable member 8 is also formed with a curved surface 12 provided with teeth 13' that are adapted to cooperate with teeth formed at one end of the arm 13 which is pivotally mounted on the lever that operates the movable member 8.

It will be seen that due to the construction and curvature of the surface 12, the locking arm 13 will be forced against rack or teeth 13', at an angle of 90° regardless of the varying position of the arm 13, due to the varying thickness of the hose.

The member 8 is provided with a longitudinal flange 19, and laterally extended flanges 20, which flanges 20 engage the inner surfaces of the links 16 strengthening member 8, and at the same time providing a guide adapted to hold the jaw in line, as the hose is being clamped. These flanges also prevent twisting of the jaw when the clamp is applied to hose wherein water under pressure is passing therethrough.

The lever 14 has pivotal connection with the movable member 8, at 15 or at a point adjacent to the jaw 10. Links 16 are positioned on opposite sides of the base member 5 where they are pivotally connected to the base member, the opposite ends of the links being pivotally connected to the lever 14 at 17. Thus it will be seen that due to the construction shown and described, the jaw 10 will be moved towards the jaw 7 when the lever 14 is raised to a position as shown by Figure 3 of the drawings, thereby clamping the hose held between the jaws, and compressing the hose in such a way as to prevent the flow of water through the hose. The arm 13 is now moved to a position as shown by Figure 3, whereupon the lever 14 is held in its active position against displacement caused by the pressure of the water flowing through the hose.

A finger piece indicated by the reference character 18, is formed on one end of the arm 13 and affords means whereby the arm 13 may be moved to a position to disengage the teeth of the curved surface 12 whereupon the lever 14 will be swung to its inactive position and the hose clamp removed.

I claim:

A hose clamp comprising upper and lower pivotally connected members, cooperating jaws at the outer ends of the members, an operating lever pivotally connected with the upper member, links connected with the lower member and having pivotal connection with the lever at a point above the pivot point of the lever, an arm pivotally connected with the lever and having a bifurcated end, an upstanding longitudinal flange formed along the upper edge of the upper member, said bifurcated end of the arm adapted to straddle the flange, holding the arm against twisting with respect to the pivoted members, and cooperating teeth on the upper member and bifurcated end of the arm, whereby the lever is held in various positions of adjustment.

DAVID S. KELLAM.